(No Model.)
T. H. McCOLLIN.
ARTIFICIAL LIGHT FOR PHOTOGRAPHY.
No. 445,188. Patented Jan. 27, 1891.
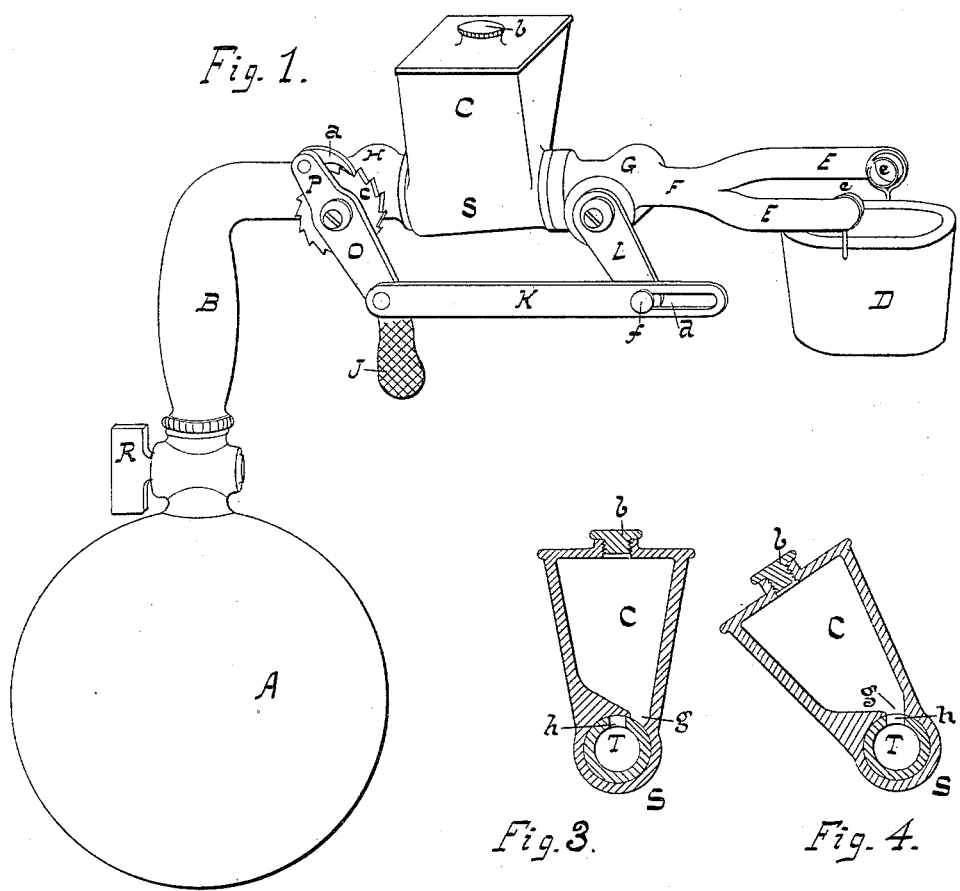
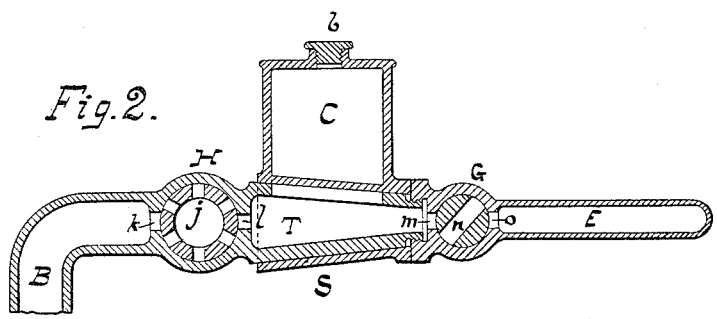
Witnesses:
Alfred H. Pilley
H. H. Suplee
Inventor.
Thos. H. McCollin.

UNITED STATES PATENT OFFICE.

THOMAS H. McCOLLIN, OF LANSDOWNE, PENNSYLVANIA.

ARTIFICIAL LIGHT FOR PHOTOGRAPHY.

SPECIFICATION forming part of Letters Patent No. 445,188, dated January 27, 1891.

Application filed April 22, 1890. Serial No. 348,966. (No model.)

*To all whom it may concern:*

Be it known that I, THOMAS H. McCOLLIN, a citizen of the United States, residing at Lansdowne, in the county of Delaware and State of Pennsylvania, have invented a new and useful Magnesium Flash-Lamp for the Production of Artificial Light for Use in Photography; and I do hereby declare that the following specification is such a full, clear, and exact description of my invention as will enable any person skilled in the art to which it appertains to construct and use it, reference being had to the accompanying drawings.

My invention relates to that class of illuminating devices which produce light by the combustion of finely-divided particles of metallic magnesium; and the object of the improvement is to secure a more rapid and complete combustion of the magnesium, and consequently to produce a more brilliant and effective light than has heretofore been attainable. This result is obtained by the use of a reservoir containing oxygen gas confined under any suitable pressure, so connected by means of suitable tubes and valves with an alcohol or other convenient form of lamp as to permit the release of a discharge of oxygen gas through a chamber containing finely-divided metallic magnesium, the mingled oxygen and magnesium passing through or into the flame of the lamp, where the rapid combustion of the oxygen and magnesium forms a powerful light of high actinic effect.

In apparatus hitherto made for this purpose the magnesium powder has been driven into the flame of the lamp by means of a blast of atmospheric air obtained by the compression of a bulb or similar means; but the small proportion of oxygen in the air thus used causes the rate of combustion to be unduly prolonged, and the imperfect combination often causes particles of magnesium to be thrown out unburned. By the use of oxygen gas in the place of air I am able to obtain such a rapid and complete combustion that the subject is not able to move before the completion of the flash. It is known that about one-sixth of a second is required to produce an impression on the retina of the eye, and in order to obtain a satisfactory photograph by a flash-light it is necessary to complete the exposure in less time than such impression can be produced. Heretofore this rapidity of flash has been obtained by the admixture with the magnesium of some oxygen-producing compound to accelerate the combustion; but in my invention I discard all other materials and use the pure magnesium powder impelled by the oxygen with which it is to be combined.

Referring to the accompanying drawings, Figure 1 represents a general view of the apparatus; Fig. 2, a longitudinal section of the working parts; Fig. 3, a cross-section of the magnesium-reservoir when closed, and Fig. 4 a corresponding cross-section when in position for charging.

Similar letters refer to similar parts in all the figures.

A is a reservoir to contain oxygen gas confined under such pressure as may be found convenient. This reservoir is shown of a spherical shape; but I do not confine myself to that especial shape, as a variety of forms may be employed. This reservoir is provided with a stop cock at R in order to close communication with the rest of the apparatus and permit the reservoir A to be removed by unscrewing it, for the purpose of charging it with the compressed oxygen gas. The portion of the tube B just above the stop-cock R is shaped so as to permit the apparatus to be conveniently held in the hand when using. At H is a stop-cock or rotary valve of peculiar construction, also shown in section in Fig. 2. The plug of this valve *j* is fitted gas-tight and provided with several openings, six being shown in the drawings, although I do not confine myself to any particular number. On the exterior end of the plug of this valve is a ratchet-wheel *c*, actuated by a pawl *a* through the medium of the lever P and O and trigger J, so that when the trigger J is drawn back the ratchet *c* will make a partial revolution, and when the trigger J is pushed forward again the pawl *a* will slip over the teeth of the ratchet *c* and permit it and the plug of the valve *j* to remain stationary. At T is a chamber which is fitted with a surrounding tube S, which forms the lower part of the funnel or reservoir C for the magnesium powder. This reservoir, which is also shown in cross-section in Figs. 3 and 4, is fitted gas-tight to the exterior of the chamber T by a taper joint, as shown, and may be moved axially about the chamber T at will. The upper part of the chamber T is provided with an opening $h$, and the lower part of the funnel C is fitted with a similar opening $g$, so that when the funnel C is moved into the position shown in Fig. 4 a charge of magnesium powder runs into the chamber T, and when the funnel C is moved back into the vertical position again, as shown in Fig. 3, the opening $h$ is closed gas-tight. At $b$ is a screw-plug to permit the funnel C to be filled, as may be necessary.

G is a second valve or stop-cock between the chamber T and the tube F, this latter tube being divided into two branches E E, whose ends $e\ e$ are bent so as to oppose each other over the lamp D. This lamp D may be of any convenient form, the style shown in the drawings being merely a vessel to contain a quantity of asbestus fiber or wicking, which, when saturated with alcohol, will give a large and hot flame. The plug of the valve G is operated by a lever L, which carries a pin $f$ in a slot $d$, which slot $d$ is formed in the end of a rod K, connected, as shown, to the trigger J, so that motion given to the rod K will only cause motion to be given to the lever L when the pin $f$ is at the extremities of the slot $d$.

The operation of the apparatus is as follows: The reservoir A being charged with oxygen gas under pressure and the funnel C also containing metallic magnesium powder, the chamber T is given a charge of magnesium powder by moving the funnel C into the position shown in Fig. 4, and then back to the position in Fig. 3. The lamp D has previously been saturated with alcohol and lighted. The stop-cock R being open and the apparatus held in the hand by the portion B, the trigger J is drawn steadily backward, carrying the lever O and moving the arm P and pawl $a$, and causing the ratchet-wheel $c$ to make a partial rotation. This moves the plug $j$ of the valve H and brings the tube B, Fig. 2, into communication with the chamber T, oxygen gas passing through the openings $k$ and $l$ into the chamber T until further motion of the plug closes the openings $k$ and $l$ again. The same motion of the trigger J also draws back the rod K, causing the slot $d$ to slide upon the pin $f$, and at first causing no motion to be transmitted to the valve G. The length of the slot $d$ is so proportioned that just as the valve H is closed again, after having admitted oxygen into the chamber T, the valve G is opened by the end of the slot $d$ coming in contact with the pin $f$, and the sudden expansion of the oxygen gas drives both it and the magnesium powder through the openings $m\ n\ o$, tubes F and E E, out of the nozzles $e\ e$ into the flame, where an intensely rapid and brilliant combustion of the magnesium instantly occurs.

In order to prepare for the next flash, the trigger J must be pushed forward again, either by hand or by any suitable mechanism. This restores the lever L to the position shown in Fig. 1, while the pawl $a$, slipping over the teeth of the ratchet-wheel $c$, is again in position for a new discharge without having opened the valve H again. The reservoir A can be made of sufficient size and strength to hold oxygen enough for many discharges, and the funnel C also carries enough magnesium to permit the reservoir T to be charged a number of times, so that a number of successive flashes can be made at close intervals when desired.

I am aware that light has been artificially produced for photographic purposes by the combustion of finely-divided metallic magnesium, and I am also aware that this combustion has been supported by a blast of oxygen in the greatly-diluted condition in which it exists in our atmosphere; but

What I claim as new, and desire to secure by Letters Patent, is—

1. The combination of a reservoir A, containing oxygen gas under pressure, tube B, valves H and G, chamber T, tubes F E E $e\ e$, and lamp D, substantially as described, and for the purpose set forth.

2. The combination of the reservoir A, containing compressed oxygen gas, tubes B, F, E, and $e$, with the valve H, ratchet-wheel $c$, pawl $a$, and trigger-lever J O P, for the purpose set forth, substantially as described.

3. The combination of the valve H, ratchet-wheel $c$, pawl $a$, trigger-lever J O P, rod K, pin $f$, slot $d$, with the lever L, and valve G, for the purpose of producing the successive action of the valves G and H, substantially as described, and for the purpose set forth.

4. The combination, with the reservoir A, containing compressed oxygen gas, of the tube B, valves H and G, chamber T, and tubes F E $e$ and lamp D, and magnesium-receptacle C, fitted to swivel axially, as shown, for the purpose of charging the chamber T with magnesium.

5. The combination, with the tube B, valves H and G, chamber T, tubes F E $e$, and lamp D, of a removable oxygen-reservoir A, enabling the said reservoir to be detached for the purpose of charging it with oxygen gas under pressure, for the purpose set forth.

THOS. H. McCOLLIN.

Witnesses:
F. WARREN,
ELMA A. COOPER.